United States Patent [19]

Biesold et al.

[11] Patent Number: 5,228,700
[45] Date of Patent: Jul. 20, 1993

[54] CONTACTLESS SEAL

[75] Inventors: Wolfgang Biesold, Bad Neustadt-Dürrnhof; Sebastian Merz, Würzburg, both of Fed. Rep. of Germany

[73] Assignee: SKF GmbH, Schweinfurt, Fed. Rep. of Germany

[21] Appl. No.: 844,950

[22] Filed: Mar. 2, 1992

Related U.S. Application Data

[63] Continuation of Ser. No. 579,022, Sep. 7, 1990, abandoned.

[30] Foreign Application Priority Data

Sep. 11, 1989 [DE] Fed. Rep. of Germany ....... 3930280

[51] Int. Cl.⁵ .................................. F16J 15/32
[52] U.S. Cl. ....................... 277/25; 277/24; 277/53
[58] Field of Search ............ 277/13, 25, 53–57; 271/14 R, 24, 67, 68, 74

[56] References Cited

U.S. PATENT DOCUMENTS

| 913,407 | 2/1909 | Ljungstrom | 277/57 |
|---|---|---|---|
| 1,574,211 | 2/1926 | Taylor | 277/53 |
| 2,247,074 | 6/1941 | Warner | 277/53 |
| 4,093,324 | 6/1978 | Carrigan | 277/57 |
| 4,101,180 | 7/1978 | Anderson et al. | 277/53 |
| 4,114,902 | 9/1978 | Orlowski | 277/53 |
| 4,363,490 | 12/1982 | Kuehn | 277/56 |
| 4,529,209 | 7/1985 | Nii et al. | 277/25 |
| 4,667,967 | 5/1987 | Deuring | 277/53 |
| 4,743,034 | 10/1988 | Kakabaker et al. | 277/53 |

FOREIGN PATENT DOCUMENTS

| 0470121 | 6/1926 | Fed. Rep. of Germany | 277/57 |
|---|---|---|---|
| 61581 | 6/1912 | Switzerland . | |
| 0752084 | 7/1980 | U.S.S.R. | 277/53 |
| 0698729 | 10/1953 | United Kingdom | 277/57 |
| 2041111 | 9/1980 | United Kingdom | 277/57 |

Primary Examiner—William A. Cuchlinski, Jr.
Assistant Examiner—Daniel G. DePumpo
Attorney, Agent, or Firm—Rosen, Dainow & Jacobs

[57] ABSTRACT

A contactless seal for sealing a fixed machine part with respect to a machine part rotating with respect thereto, is comprised of a centrifuge ring arranged on the rotatable part, the centrifuge ring forming an annular gap with a fixed part of the seal. In order that no liquid can be forced into the bearing, even with high speed shafts or the like, the centrifuge ring forms a preferably radially directed sealing gap with a fixed part of the seal, as well as a first chamber. This first chamber is connected to at least one further annular chamber by way of a narrow annular gap, and the latter chamber is bounded by the fixed parts of the seal. One of the parts of the seal has a catching channel for catching and leading away a liquid forced into the seal.

17 Claims, 2 Drawing Sheets

CONTACTLESS SEAL

This application is a continuation of application Ser. No. 07/579,022, filed Sep. 7, 1990, now abandoned.

BACKGROUND OF THE INVENTION

This invention relates to a contactless seal for sealing a fixed machine part with respect to a machine part that is rotatable with respect thereto, consisting of a centrifuge ring arranged on the rotatable machine part, the centrifuge ring forming an annular gap with a fixed part of the seal.

A contactless sealing of this type is disclosed, for example, in CH-PS 61 581. This known seal is unsuitable, however, for example, for machines having high speed shafts, since liquids and dirt can easily be forced into such bearings in the cooling fluid of the bearing.

SUMMARY OF THE INVENTION

It is an object of the present invention to provide a contactless seal, especially for high speed shafts or the like, which is fabricated of easily produced parts, and which prevents liquids from penetrating the bearing.

In accordance with the invention, this object is achieved by the provision of a seal having a centrifuge ring that forms a preferably radially extending sealing gap with a fixed part of the seal, and wherein an annular chamber is provided which is connected to a further chamber via a narrow annular gap, the latter chamber being substantially completely bounded by fixed parts of the seal. In this arrangement, one of the fixed parts of the seal has a catching channel for catching and directing away liquids that have been forced into the seal.

This configuration of the seal results in an excellent seal, which also can be used under water.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
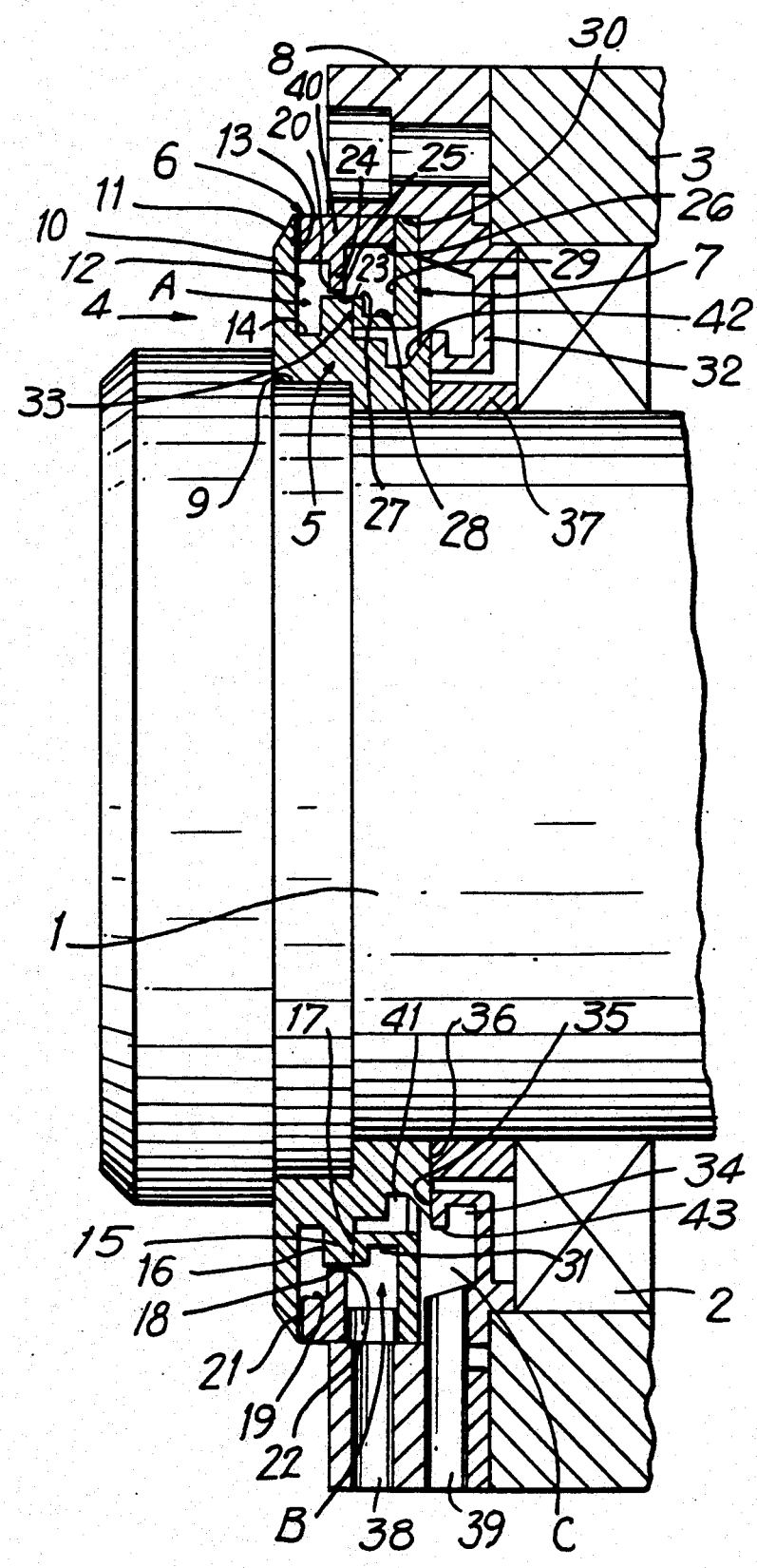
FIG. 1 is a cross sectional view of a portion of a sealing arrangement in accordance with the invention.
Figure 2:
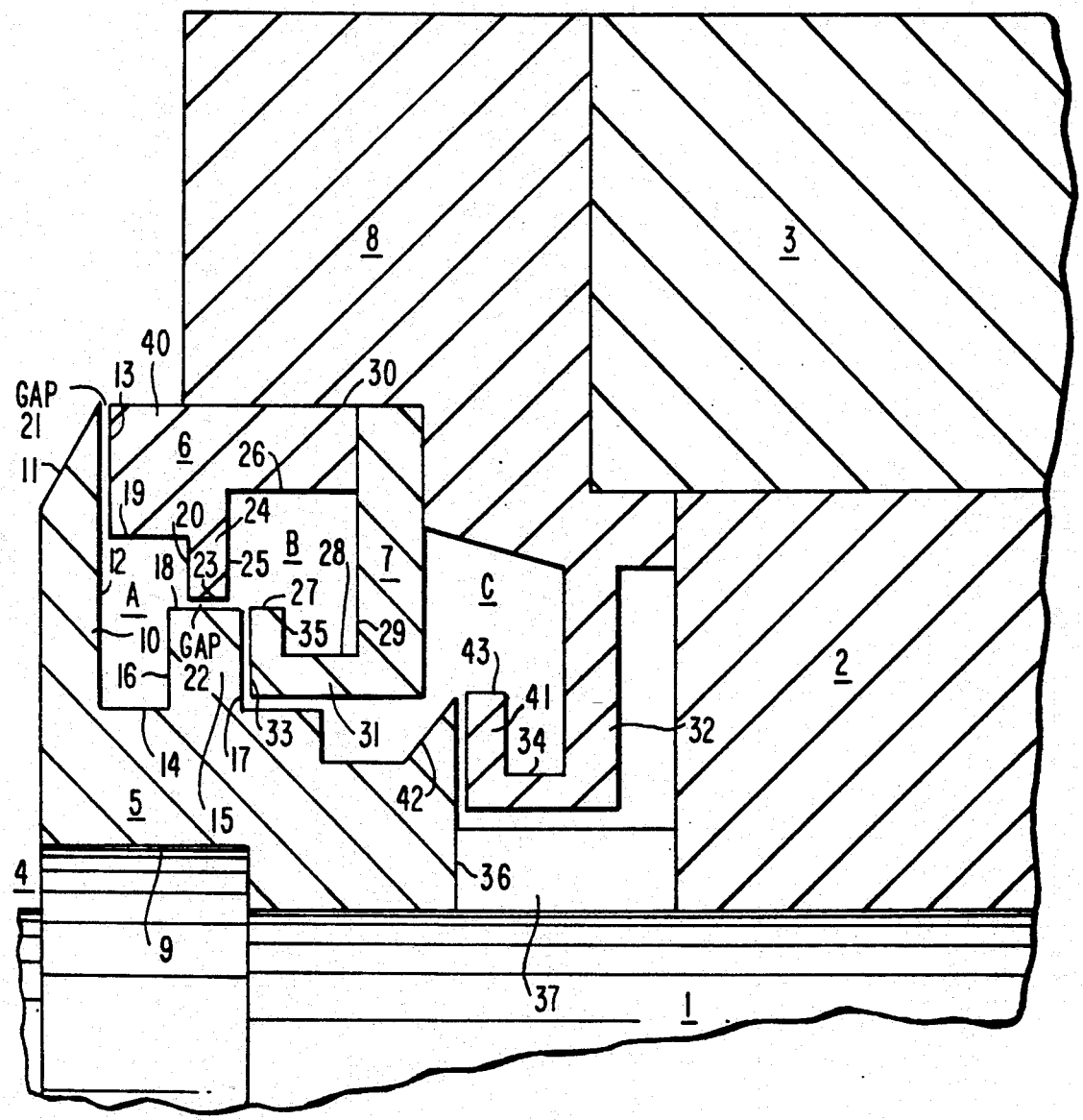
FIG. 2 is an enlarged sketch of a portion of the sealing arrangement of FIG. 1.

As illustrated in the FIGS. 1 and 2, a machine shaft 1 is mounted in a housing 3 (only part of which is illustrated) by way of bearings 2. The space between the housing 3 and the shaft 1 is closed by a contactless seal 1 which provides an effective seal for preventing the entry of liquids, dirt and the like into the bearing. The seal is comprised of a centrifuge ring 5, a cover ring 6 and an L-shaped catching ring 7. These rings 5, 6, 7 are arranged in a housing ring 8. The cover ring 6 and the catching ring 7, as well as the housing ring 8, form the fixed part of the seal that is affixed to the housing 3 by screws (not illustrated), the screws extending, for example through screw holes of the type illustrated in the upper part of the housing ring 8.

The centrifuge ring 5 has an inner bore portion mounted on a shoulder portion 9 of the shaft 1, and has a radially outwardly directed axially outward centrifuge projection 10 with an inclined radially outer surface 11 for throwing or slinging off liquids in a radial direction. The axially inner surface 12 of this centrifuge projection 10 extends in the radial direction to be adjacent, with play, to a respective radially extending surface 13 of the cover ring 6, to define a gap 21. A radially extending annular projection 15 extends outwardly from the outer surface 14 of the centrifuge ring 5, axially inwardly of the projection 10, the projection 15 having side surfaces 16, 17 and a radially outer surface 18. The radially directed inner surface 12 of the centrifuge projection 10, the outer surface 14 of the centrifuge ring 5, one side surface 16 of the projection 15, an axially outer bore surface 19 of the cover ring 6 and a radial surface 20 of the cover ring 6 axially inwardly of the bore surface 19, define a first annular chamber A for collecting liquid or other materials forced into the seal by way of the radially extending gap 21 between the adjacent surfaces of the projection 10 and the surface 13 of the cover ring 6. The first annular chamber A is connected to a second annular chamber B by a narrow axial gap 22 between the outer surface 18 of the projection 15 and the bore surface 23 of a projection 24 extending radially inwardly from the cover ring 6.

The projection 15 is wider than the projection 24 and the side surface 16 of the projection 15 is axially outwardly of the projection 24, so that liquids forced in the first annular chamber A are thrown into the outer regions of the chamber for ejection via the gap between the centrifuge projection 10 and the cover ring 6. Due to the provision of the narrow annular axial gap 22, a throttle effect suppresses the pressure that tends to force liquid through the gap 22. The second annular chamber B is defined by a radially extending surface 25 of the axially inner annular projection 24 of the cover ring 6, a bore surface 26 of the cover ring 6 axially outward of the surface 25, and axially extending surfaces 27, 28 and radially extending side surface 29 of the L-shaped catching ring 7. The catching ring 7 and the cover ring 6 are arranged in the bore 30 of the housing ring 8, with the catching ring 7 being held in the axial direction against a shoulder of the housing 8 by the cover ring 6. The catching ring 7 has a first catching channel 31 for catching and carrying away liquids forced into the second annular chamber B. Since the second annular chamber B is not bounded by rotating parts (except perhaps, in the illustrated embodiment, by a small portion of the surface 15 of the projection 15), undesirable swirling of liquids cannot occur in this chamber. The second annular chamber B moreover has a very uniform pressure distribution.

A third annular chamber C is bounded by the catching ring 7, a second L-shaped catching ring 32 (formed, for example, as a unit with the housing ring 8) and the housing ring 8. The catching ring 7 has an axially inner side surface 33 that is adjacent, with axial play, an axially inner side surface 17 of the projection 15, and with radial play with respect to the outer surface 14 of the centrifuge ring 5. The catching ring 32 has a second catching channel 34 that has a side surface 35 adjacent, with axial play, an axially inner side surface 36 of the centrifuge ring 5 and spaced with radial play from a spacing shell 37 that extends between the bearing 2 and centrifuge ring 5.

The third annular chamber C is likewise not bounded by rotating parts, so that laminar current conditions and uniform pressure distribution also occurs in this chamber. The third annular chamber C may be provided with a compressed air supply (not illustrated), for forcing liquid that enters this chamber outwardly. Such a compressed air supply is necessary only for rotational speeds of the shaft up to 800 revolutions per minute. At rotational speeds over 800 revolutions per minute, self supporting air is sucked in due to the pressure formed in the radial seal gap.

The housing ring 8 is provided with run off bores 38, 39 in its lower regions, so that liquids can flow from the catching channels 31, 34 into the run off bores.

The seal in accordance with the invention operates in the following manner:

Upon rotation of the shaft, the centrifuge ring 5 is also rotated, so that a part of any liquid in the first annular chamber A is thrown radially outwardly from the seal, via the gap 21 between the projection 10 and the surface 13, by the centrifuge projection 10. The axially directed shoulder 40 of the cover ring 6 further hinders liquids from being directly sprayed into the gap 21.

One part of the liquid forced in the gap 21 is again flung out via the gap 21 by the radially outwardly directed suction developed by the rotating centrifuge projection 10. Liquid remaining in the first annular chamber A may be directed into the second annular chamber B, via the axial gap 22, and thence into the catching channel of the catching ring 7, so that a part of the liquid drops from this channel into the run off bore 38. In the event that liquid should be directed through the axial and radial gap between the catching ring 7 and the centrifuge ring 5, such liquid is collected in the catching channel 41 of the centrifuge ring 5. It flows from there to the channel 34 via an inclined surface 42 of the centrifuge ring 5, which extends to the outer surface 43 of the enclosing ring of the catching channel 34, and thence to the run off bore 39. The liquid normally advances, however, only as far as the second annular chamber B, where it is stopped by the air pressure or the suction formed in the seal by rotation of the shaft. The seal 4 is so configured, that it can be used effectively even under water.

The above described embodiment represents only one example of a seal in accordance with the invention. Changes in the construction of the individual parts thereof are within the scope of the invention, without the necessity of their detailed descriptions herein. For example, one or more radial space limiting side surfaces in the seal may be provided with advancing grooves such as spiral grooves.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a contactless seal for sealing a fixed machine element with respect to a machine element that is rotatable with respect to the fixed element, said seal having a movable part adapted to rotate with the rotatable machine element and a fixed part adapted to be affixed to said fixed machine element, said movable part including a centrifuge ring arranged on the rotatable machine element, the centrifuge ring forming an annular gap with the fixed part of the seal, the improvement wherein the centrifuge ring forms, in combination with the fixed part of the seal, a seal gap and a first annular chamber, said seal further comprising a second annular chamber connected to said first annular chamber via an axially extending rotating throttle gap defined by first and second radially extending projections of said fixed and movable parts, respectively, said throttle gap suppressing pressure tending to force liquid therethrough, the bounds of said second annular chamber being defined primarily by said fixed part of said seal, and still further comprising a catching channel formed in at least one of said parts of said seal for catching and leading away liquid in said seal.

2. The contactless seal of claim 1 wherein the fixed part of the seal is comprised of a housing ring, a cover ring and a first L-shaped catching ring defining said catching channel, said cover ring and first catching ring being mounted in a bore of the housing ring.

3. In a contactless seal for sealing a fixed machine element with respect to a machine element that is rotatable with respect to the fixed element, said seal having a movable part adapted to rotate with the rotatable machine element and a fixed part adapted to be affixed to said fixed machine element, said movable part including a centrifuge ring arranged on the rotatable machine element, the centrifuge ring forming an annular gap with the fixed part of the seal, the improvement wherein the centrifuge ring forms, in combination with the fixed part of the seal, a seal gap and a first annular chamber, said seal further comprising a second annular chamber connected to said first annular chamber via a narrow axially extending rotating gap defined by first and second radially extending projections of said fixed and movable parts, respectively, the bounds of said second annular chamber being defined primarily by said fixed part of said seal, and still further comprising a catching channel formed in at least one of said parts of said seal for catching and leading away liquid in said seal, the fixed part of the seal being comprised of a housing ring, a cover ring and a first L-shaped caching ring defining said catching channel, said cover ring and first catching ring being mounted in a bore of the housing ring, said centrifuge ring having an axially outer centrifuge projection, said second projection being axially inwardly of the centrifuge projection, the axially inner surface of the centrifuge projection, a radially outer surface of the centrifuge ring, one side surface of the second projection, and the bore surface and a radial surface of the cover ring, defining said first annular chamber.

4. The contactless seal of claim 3 wherein said second annular chamber is bounded by a side surface and bore surface of the cover ring and by a radially outer surface and side surface of said first L-shaped catching ring.

5. In a contactless seal for sealing a fixed machine element with respect to a machine element that is rotatable with respect to the fixed element, said seal having a movable part adapted to rotate with the rotatable machine element and a fixed part adapted to be affixed to said fixed machine element, said movable part including a centrifuge ring arranged on the rotatable machine element, the centrifuge ring forming an annular gap with the fixed part of the seal, the improvement wherein the centrifuge ring forms, in combination with the fixed part of the seal, a seal gap and a first annular chamber, said seal further comprising a second annular chamber connected to said first annular chamber via a narrow axially extending rotating gap defined by first and second radially extending projections of said fixed and movable parts, respectively, the bounds of said second annular chamber being defined primarily by said fixed part of said seal, and still further comprising a catching channel formed in at least one of said parts of said seal for catching and leading away liquid in said seal, said seal further comprising a first catching ring defining said catching channel, a third annular chamber bounded by said first mentioned catching ring, and a second catching ring in said housing ring.

6. The contactless seal of claim 5, further comprising means for supplying compressed air to said third annular chamber.

7. The contactless seal of claim 3 wherein the first catching channel is adjacent a side surface of said second projection of said centrifuge ring, with axial play, and is spaced from an axially extending outer surface of said centrifuge ring, with radial play.

8. The contactless seal of claim 1 wherein a second catching ring is arranged with axial spacing adjacent a side surface of the centrifuge ring, and with radial spacing from a spacing sleeve extending between said centrifuge ring and a bearing between said fixed and rotatable machine elements.

9. The contactless seal of claim 2 wherein the housing ring has a run off bore positioned below the catching channel.

10. The contactless seal of claim 2 wherein the cover ring has an axially directed shoulder defining a part of said first annular chamber.

11. The contactless seal of claim 3 wherein the radially outer end of the centrifuge projection is tapered.

12. The contactless seal of claim 1 wherein the centrifuge ring has a catching channel.

13. The contactless seal of claim 1 comprising a second catching ring having a second catching channel, wherein said centrifuge ring has an inclined surface which extends to an axially outer surface of said second catching ring.

14. The contactless seal of claim 1 wherein said seal gap is radially directed.

15. The contactless seal of claim 5 wherein said second catching ring is unitary with said housing ring.

16. The contactless seal of claim 1 further comprising a third annular chamber defined primarily by said fixed part of said seal and connected to said second annular chamber via a third gap between said movable part and said fixed part.

17. The contactless seal of claim 16 further wherein said third gap includes an inclined surface directed to said third annular chamber.

* * * * *